(12) United States Patent
Huang et al.

(10) Patent No.: US 11,151,406 B2
(45) Date of Patent: Oct. 19, 2021

(54) METHOD, APPARATUS, DEVICE AND READABLE STORAGE MEDIUM FOR IMAGE-BASED DATA PROCESSING

(71) Applicant: Beijing Baidu Netcom Science and Technology Co., Ltd., Beijing (CN)

(72) Inventors: Jianhui Huang, Beijing (CN); Pingping Huang, Beijing (CN); Min Qiao, Beijing (CN); Ying Li, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 168 days.

(21) Appl. No.: 16/690,432

(22) Filed: Nov. 21, 2019

(65) Prior Publication Data

US 2020/0257922 A1  Aug. 13, 2020

(30) Foreign Application Priority Data

Feb. 12, 2019 (CN) .......................... 201910111412.5

(51) Int. Cl.
*G06K 9/00* (2006.01)
*G06K 9/46* (2006.01)
(Continued)

(52) U.S. Cl.
CPC .......... *G06K 9/4671* (2013.01); *G06F 16/583* (2019.01); *G06F 40/30* (2020.01);
(Continued)

(58) Field of Classification Search
CPC ...... G06K 9/4671; G06K 9/18; G06K 9/6211; G06K 9/6215; G06K 9/6271; G06K 2209/27; G06F 16/583; G06F 40/30
(Continued)

(56) References Cited

U.S. PATENT DOCUMENTS

2012/0177297 A1* 7/2012 Everingham .......... G06K 9/325
382/229
2017/0124432 A1   5/2017 Chen et al.
(Continued)

FOREIGN PATENT DOCUMENTS

CN      106649542 A    5/2017
CN      108228703 A    6/2018
(Continued)

OTHER PUBLICATIONS

Zhou, T. et al., "Attention-based Natural Language Person Retrieval," 2017 IEEE Conference on Computer Vision and Pattern Recognition Workshops, pp. 27-34 (2017).
(Continued)

*Primary Examiner* — Stephen P Coleman
(74) *Attorney, Agent, or Firm* — Nixon Peabody LLP

(57) ABSTRACT

Embodiments of the present disclosure disclose a method, apparatus, device, and readable storage medium for image-based data processing. The method comprises: acquiring an image and a to-be-processed text; extracting features of a plurality of objects in the image, and extracting a feature of the text; fusing the features of the plurality of objects into a fused feature of the image based on a matching degree between the feature of the text and a feature of each object of the plurality of objects; and processing the text based on the fused feature of the image and the feature of the text. Embodiments of the present disclosure can accurately learn an association relationship between a text and each object in an image, and improve the processing accuracy.

10 Claims, 6 Drawing Sheets

(51) Int. Cl.
  *G06F 16/583* (2019.01)
  *G06F 40/30* (2020.01)
  *G06K 9/18* (2006.01)
  *G06K 9/62* (2006.01)

(52) U.S. Cl.
  CPC .............. *G06K 9/18* (2013.01); *G06K 9/6211* (2013.01); *G06K 9/6215* (2013.01)

(58) Field of Classification Search
  USPC ........................................................ 382/103
  See application file for complete search history.

(56) References Cited

U.S. PATENT DOCUMENTS

2017/0364492 A1* 12/2017 Pushnyakov ...... G06K 9/00456
2020/0193228 A1   6/2020 Lu et al.

FOREIGN PATENT DOCUMENTS

| | | |
|---|---|---|
| CN | 108288067 A | 7/2018 |
| CN | 108446404 A | 8/2018 |
| CN | 108898185 A | 11/2018 |
| CN | 108920587 A | 11/2018 |
| EP | 3166049 A1 | 5/2017 |
| KR | 10-2017-0136964 A | 12/2017 |
| KR | 10-2018-0038937 A | 4/2018 |

OTHER PUBLICATIONS

Akbari, H. et al., "Multi-level Multimodal Common Semantic Space for Image-Phrase Grounding," 2019 IEEE/CVF Conference on Computer Vision and Pattern Recognition, pp. 1-11 (2019).

* cited by examiner

METHOD, APPARATUS, DEVICE AND READABLE STORAGE MEDIUM FOR IMAGE-BASED DATA PROCESSING

CROSS-REFERENCE TO RELATED APPLICATIONS

This application claims priority to Chinese Patent Application No. 201910111412.5, filed on Feb. 12, 2019, titled "Method, Apparatus, Device and Readable Storage Medium for Image-Based Data Processing," which is hereby incorporated by reference in its entirety.

TECHNICAL FIELD

Embodiments of the present disclosure relate to the computer vision technology, and in particular to, a method, apparatus, device, and readable storage medium for image-based data processing.

BACKGROUND

With the development of computer vision technology, a method for image-based data processing, such as vision question answer, is emerging. Visual question answer (VQA) is one of the leading-edge applications of multi-modal data mining intended for natural language question and answer on visual images, and connects vision with language as a research direction of visual understanding. VQA needs to process specific text questions based on understanding of the images.

The current method for image-based data processing first extracts low-level features of an image and a text respectively using two different underlying representation systems, learns high-level features of the image and the text, associates high-level features of the image and the text by an associated learning module, and then processes the text.

The current method for image-based data processing needs to learn an association relationship between the text and each object in the image based on a feature of the image and a feature of the text, such that the association relationship has a low accuracy, thereby resulting in incorrect text processing.

SUMMARY

Embodiments of the present disclosure provide a method, apparatus, device, and readable storage medium for image-based data processing, to accurately learn an association relationship between a text and each object in an image, and improve the processing accuracy.

In a first aspect, an embodiment of the present disclosure provides a method for image-based data processing, including:

acquiring an image and a to-be-processed text;

extracting features of a plurality of objects in the image, and extracting a feature of the text;

fusing the features of the plurality of objects as a fused feature of the image based on a matching degree between the feature of the text and a feature of each object of the plurality of objects; and processing the text based on the fused feature of the image and the feature of the text.

In a second aspect, an embodiment of the present disclosure further provides an apparatus for image-based data processing, including:

an acquiring module configured to acquire an image and a to-be-processed text;

an extracting module configured to extract features of a plurality of objects in the image, and extract a feature of the text;

a fusing module configured to fuse the features of the plurality of objects as a fused feature of the image based on a matching degree between the feature of the text and a feature of each object of the plurality of objects; and a processing module configured to process the text based on the fused feature of the image and the feature of the text.

In a third aspect, an embodiment of the present disclosure further provides an electronic device, including:

one or more processors; and a memory configured to store one or more programs, where the one or more programs, when executed by the one or more processors, cause the one or more processors to implement the method for image-based data processing according to any one embodiment of the present disclosure.

In a fourth aspect, an embodiment of the present disclosure further provides a computer readable storage medium, storing a computer program thereon, where the program, when executed by a processor, implements the method for image-based data processing according to any one embodiment of the present disclosure.

The embodiments of the present disclosure acquire an image and a to-be-processed text, extract features of a plurality of objects in the image, extract a feature of the text, fuse the features of the plurality of objects as a fused feature of the image based on a matching degree between the feature of the text and a feature of each object of the plurality of objects, make full use of the prior knowledge that the feature of the text is associated with the feature of the object, and adjust the feature of the image based on the matching degree, such that the fused feature pays more attention to a part strongly associated with the text, to avoid attention distribution and dispersion; and can improve the processing accuracy based on the fused feature strongly associated with the text and the feature of the text.

DETAILED DESCRIPTION OF EMBODIMENTS

The present disclosure will be further described below in detail in combination with the accompanying drawings and the embodiments. It should be appreciated that the specific embodiments described herein are merely used for explaining the present disclosure, rather than limiting the present disclosure. In addition, it should be further noted that, for the ease of description, only the parts related to the present disclosure, instead of the whole structure, are shown in the accompanying drawings.

Embodiment I

Figure 1A:
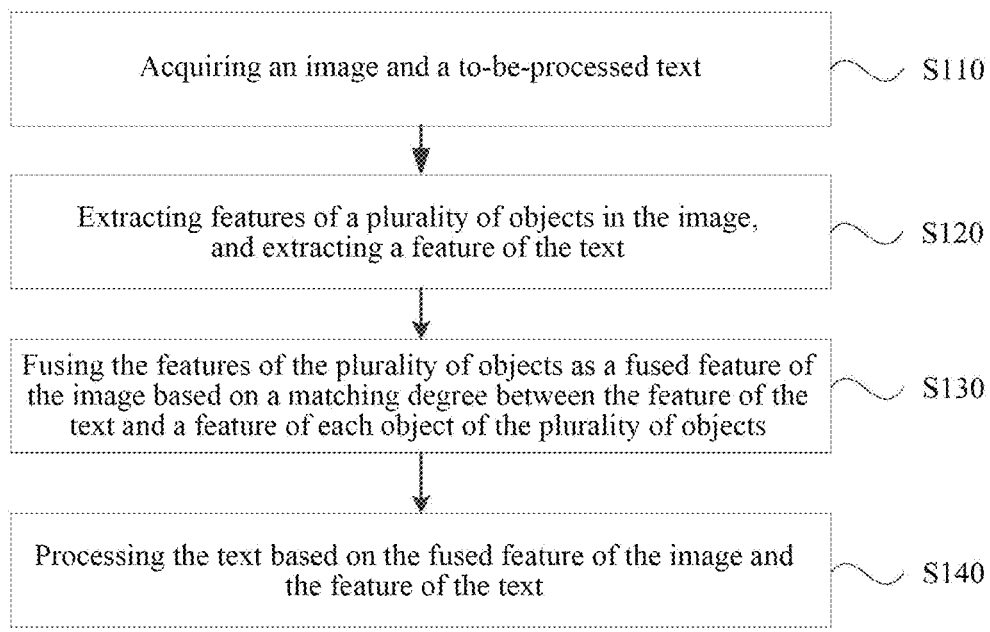
FIG. 1a is a flowchart of a method for image-based data processing according to Embodiment I of the present disclosure.

FIG. 1a is a flowchart of a method for image-based data processing according to Embodiment I of the present disclosure. The present embodiment may be applicable to a case of identifying an image and processing a text. The method may be executed by an apparatus for image-based data processing. The apparatus may be composed of hardware and/or software, is generally integrated into an electronic device, and specifically includes the following operations S110 to S140.

S110: acquiring an image and a to-be-processed text.

In the present embodiment, the image may be a photo, a screenshot, a video frame, and the like. The to-be-processed text is a text including free-form and open natural language related to the image. The to-be-processed text includes understanding of the text, such as true or false determination, and text content interpretation. The to-be-processed text further includes natural language questions, and the types of the questions presented by the text include, but are not limited to, fine-grain identification (e.g., is this lady a white people?), object identification (e.g., how many bananas are there in the figure?), behavior identification (e.g., is this lady crying?), and understanding of texts included in the questions.

S120: extracting features of a plurality of objects in the image, and extracting a feature of the text.

Alternatively, the image is inputted into a target detection model or a classification model, to extract features of a plurality of objects in the image. Further, coordinates of a bounding box of each object are further extracted. The target detection model or the classification model may be a target detection model or a classification model based on deep learning, e.g., R-CNN, and Fast R-CNN.

Figure 1B:
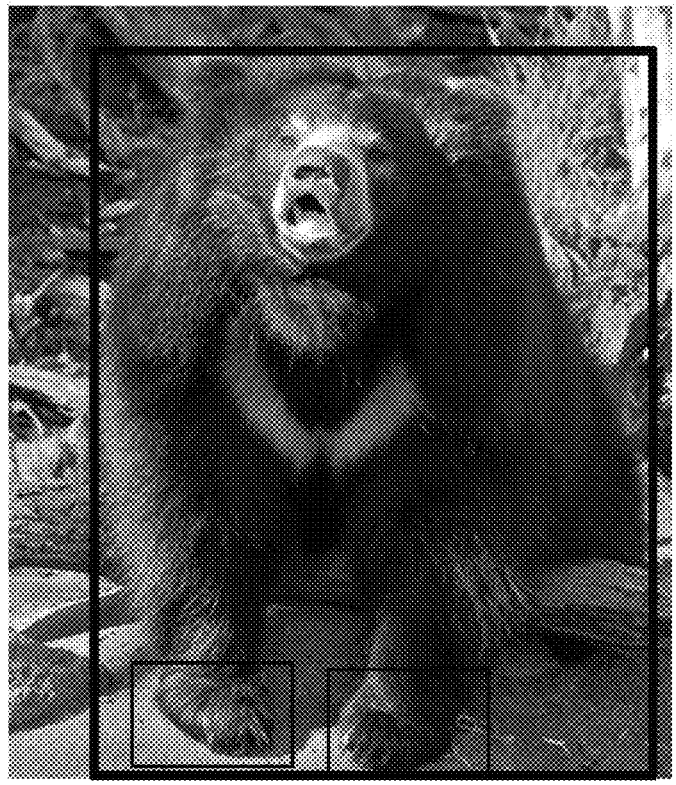
FIG. 1b is a schematic diagram of a bounding box of each object according to Embodiment I of the present disclosure.

Alternatively, the number of to-be-extracted objects is preset, such as 36, or 52. The target detection model extracts a preset number of features of the objects, and extracts the coordinates of the bounding box of each object. FIG. 1b is a schematic diagram of a bounding box of each object according to Embodiment I of the present disclosure. FIG. 1b shows two objects, which are respectively a bear body and a bear paw. The bounding box where the bear body is located is represented by a thick solid line, while the bounding box where the bear paw is located is represented by a thin solid line.

Alternatively, the feature of the text is extracted by a bag of words model or a Recurrent Neural Network (RNN).

S130: fusing the features of the plurality of objects as a fused feature of the image based on a matching degree between the feature of the text and a feature of each object of the plurality of objects.

According to an attention mechanism, when observing the image, people actually do not watch each pixel of the whole image for one time, but mostly focuses attention on a specific part of the image as needed, such as a face of a person. Furthermore, based on an image observed before, people learn a position on which the attention should be focused when observing the image in the future. Similarly, for the text, attention on each object in the image is also different. For example, for "can you see the bear paw?" the attention should be focused on the bear paw in FIG. 1b. For another example, for "what is the bear's expression" the attention should be focused on a bear head in FIG. 1b.

Figure 1C:
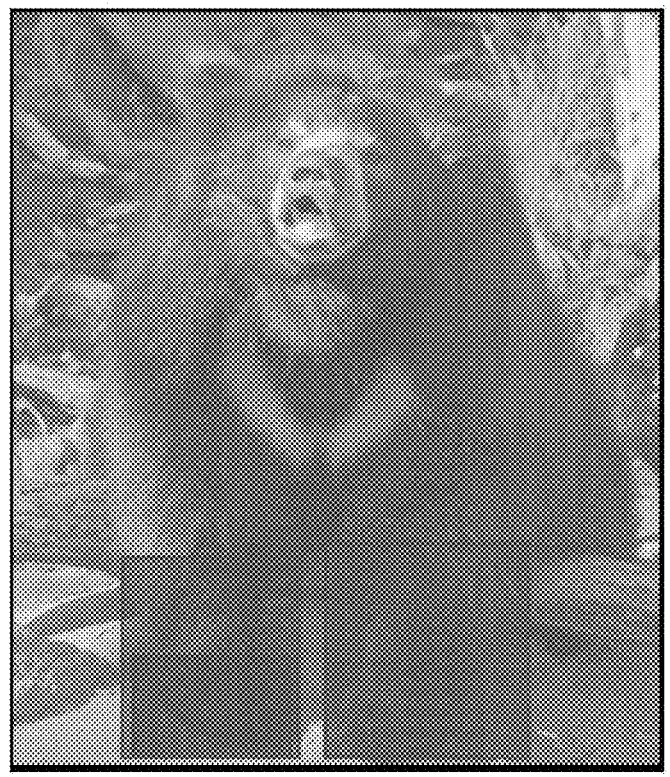
FIG. 1c is a schematic diagram of an image corresponding to a fused feature according to Embodiment I of the present disclosure.

Based on the above analysis, the text can be more accurately processed based on a feature of an object on which the text pays more attention. In the present embodiment, the attention of the text on each object is represented using the matching degree between the feature of the text and the feature of each object. Thus, the feature of each object is adjusted based on the matching degree between the feature of the text and the feature of each object. For example, a feature of an object, having a great matching degree with the feature of the text, is strengthened, a feature of an object, having a small matching degree with the feature of the text, is weakened; and then, an adjusted feature of each object is fused as a new feature of the image. For the ease of description and distinguishing, the fused new feature of the image is known as the fused feature of the image. FIG. 1c is a schematic diagram of an image corresponding to a fused feature according to Embodiment I of the present disclosure. For example, the to-be-processed text is "can you see the bear paw?". A matching degree between the feature of the text and a feature of the bear paw object is 90%, a matching degree between the feature of the text and a feature of a bear leg is 50%, and a matching degree between the feature of the text and features of other objects (e.g., a tree trunk object, and a grass cluster object) is 10%. Then, a feature of a corresponding object is adjusted using a matching degree, and a fused feature of the image is obtained by fusion. Alternatively, a feature of an object having a matching degree with the feature of the text greater than or equal to a matching degree threshold is retained or strengthened, a feature of an object having a matching degree with the feature of the text smaller than the matching degree threshold is deleted or weakened, and then the retained features are fused to obtain the fused feature of the image. As can be seen from FIG. 1c, the feature of the bear paw is strengthened, the feature of the bear leg is not changed, and the features of other objects are weakened.

Before fusing the features of the plurality of objects as a fused feature of the image based on a matching degree between the feature of the text and a feature of each object of the plurality of objects, the method further includes calculating the matching degree between the feature of the text and the feature of each object. Alternatively, the features of the plurality of objects in the image are extracted, and a category of each object is acquired, e.g., the bear paw, the bear leg, the tree trunk, the grass cluster, and the like. The category of each object is searched for in the text, and the matching degree between the feature of the text and the feature of each object is determined based on a searching result. For example, the "bear paw" and "bear" of the "bear leg" are found, but the "tree trunk" or the "grass cluster" is not found in "can you see the bear paw?". Therefore, it is determined that there is a great matching degree between the feature of the text and the feature of the bear paw object, a moderate matching degree between the feature of the text and the feature of the bear leg, and a small matching degree between the feature of the text and features of the tree trunk object and grass cluster objects.

S140: processing the text based on the fused feature of the image and the feature of the text.

Alternatively, the text processing includes, but is not limited to, understanding of the text, such as true or false determination, text content interpretation; and answer to the text.

Alternatively, the fused feature of the image and the feature of the text are inputted into a visual question answer (VQA) system, to obtain an answer outputted from the VQA system. The VQA system according to the present embodiment includes a combination of the following models, e.g., Deeper LSTM Q+norm I model, VIS+LSTM model, 2-VIS+BLSTM, and IMG+BOW.

The embodiments of the present disclosure acquire an image and a to-be-processed text, extract features of a plurality of objects in the image, extract a feature of the text, fuse the features of the plurality of objects as a fused feature of the image based on a matching degree between the feature of the text and a feature of each object of the plurality of objects, make full use of the prior knowledge that the feature of the text is associated with the feature of the object, and adjust the feature of the image based on the matching degree, such that the fused feature pays more attention to a part strongly associated with the text, to avoid attention distribution and dispersion; and can improve the processing accuracy based on the fused feature strongly associated with the text and the feature of the text.

Embodiment II

Figure 2A:
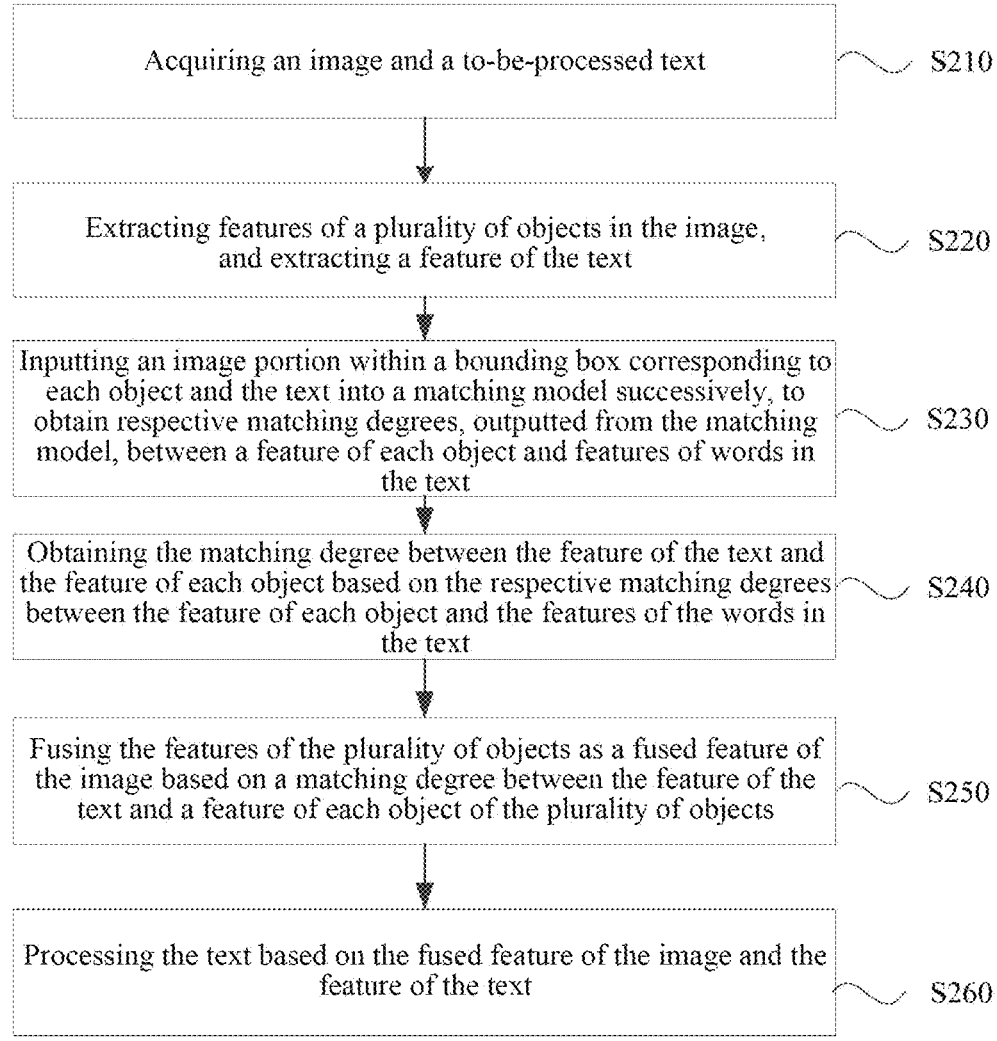
FIG. 2a is a flowchart of a method for image-based data processing according to Embodiment II of the present disclosure.

The present embodiment is further optimized on the basis of various alternative implementations of the above embodiment. Alternatively, before the "fusing the features of the plurality of objects as a fused feature of the image based on a matching degree between the feature of the text and a feature of each object of the plurality of objects," the step of "inputting an image portion within a bounding box corresponding to each object and a text into a matching model successively, to obtain respective matching degrees, outputted from the matching model, between a feature of each object and features of words in the text; and obtaining the matching degree between the feature of the text and the feature of the each object based on the respective matching degrees between the feature of the each object and the feature of the words in the text" is added. FIG. 2a is a flowchart of a method for image-based data processing according to Embodiment II of the present disclosure. The method according to the present embodiment includes steps S210 to 260.

S210: acquiring an image and a to-be-processed text.

S220: extracting features of a plurality of objects in the image, and extracting a feature of the text.

S230: inputting an image portion within a bounding box corresponding to each object and a text into a matching model successively, to obtain respective matching degrees, outputted from the matching model, between a feature of each object and features of words in the text.

Based on related description of the above embodiments, each image portion is inputted into a target detection model or a classification model successively, to extract features of a plurality of objects in the image, and coordinates of the bounding box of each object. In the present embodiment, an image portion within a bounding box corresponding to each object is screenshotted from the image based on the coordinates of the bounding box of each object. Then, an image portion within the bounding box corresponding to each object are inputted into a matching model successively. When a first image portion is inputted, the text should also be inputted. The text is inputted merely once, and may not be inputted any longer when subsequent image portions are inputted. The text may alternatively be inputted when image portions are inputted each time.

Figure 2B:
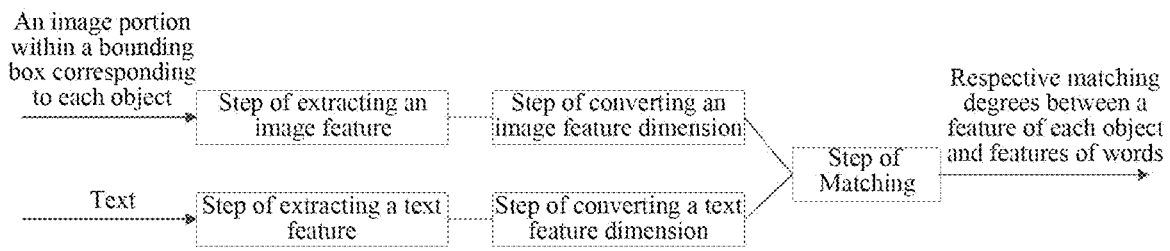
FIG. 2b is a schematic flowchart of performing a matching through a matching model according to Embodiment II of the present disclosure.

FIG. 2b is a schematic flowchart of matching performed by a matching model according to Embodiment II of the present disclosure. In conjunction with FIG. 2, the matching model includes: a step of extracting an image feature, a step of extracting a text feature, a step of converting an image feature dimension, a step of converting a text feature dimension, and a step of matching.

The step of extracting an image feature is used for extracting the feature of each object from the image portion within the bounding box corresponding to each object; the step of converting an image feature dimension is used for converting a dimension of the feature of each object into a preset dimension; the step of extracting a text feature is used for extracting the feature of each word in the text; the step of converting a text feature dimension is used for converting a dimension of the feature of each word in the text into the preset dimension; the step of matching is used for calculating the respective matching degrees between the feature of each object with the preset dimension and the features of the words with the preset dimension.

In general, the image contains more information than the text. After extracting the feature, the dimension of the feature of each object is different from the dimension of the feature of each word in the text. For example, the dimension of the feature of each object is 1024, and the dimension of the feature of each word is 300, which need to be converted into the preset dimension, to compute the matching degree between the feature of each object and the feature of each word. Specifically, the extracted features are converted by matrix transformation to obtain features in a same dimension, e.g., 600-dimensional feature.

Then, during the matching, the matching degree between the feature of each object with the preset dimension and the feature of each word with the preset dimension is calculated. Alternatively, the step of matching is specifically used for calculating a respective distance between the feature of each object and the feature of each word in the text, a respective cosine similarity between the feature of each object and the feature of each word in the text, or a combination of the distance and the cosine similarity, to obtain the matching degree between the feature of each object and the feature of each word in the text. Alternatively, the distance includes a Euclidean distance, a Mahalanobis distance, and the like. For the case of calculating the distance and the cosine similarity to obtain the matching degree, a greater value, a smaller value, or an average value of the distances and the cosine similarities between the feature of each object and the feature of each word in the text may be selected to obtain the matching degree between the feature of each object and the feature of each word in the text.

Figure 2C:
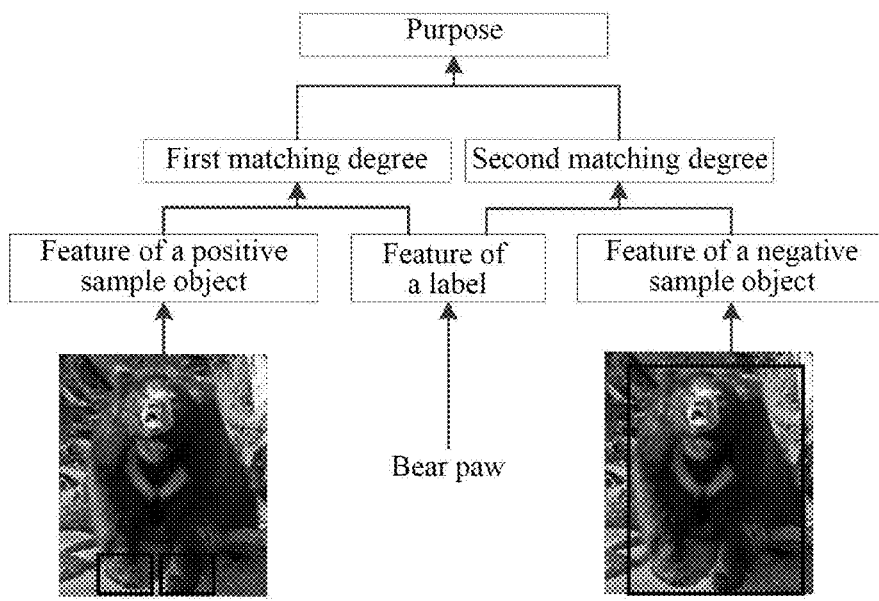
FIG. 2c is a flowchart of training a matching model according to Embodiment II of the present disclosure.

In an alternative embodiment, before inputting the image portion within the bounding box corresponding to each object and the text into to the matching model successively, the method further includes training the model matching. FIG. 2c is a flowchart of training the matching model according to Embodiment II of the present disclosure. The training process generally includes step I to III.

Step I: acquiring an image portion within a bounding box corresponding to a positive sample object for training the matching model, an image portion within a bounding box corresponding to a negative sample object for training the matching model, and a label of the positive sample object. The label of the positive sample object is a category of the positive sample object.

Annotation information of each image in a VG data set includes each object in the image, a relationship, and an attribute, and coordinates of the object and the attribute in the bounding box of the image. The object is strongly associated with the image portion within the corresponding bounding box.

In the present embodiment, the image and the label are acquired using the existing VG (Visual Genome) data set. Specifically, the preset positive sample object is S, the label corresponding to the positive sample object is also S, and the negative sample object is non-S. On the VG data set, the image portion within the bounding box corresponding to the positive sample object is screenshotted based on coordinates of the bounding box of the positive sample object S in the image, and the image portion within the bounding box corresponding to the negative sample object is screenshotted based on coordinates of the bounding box of the negative sample object (non-S) in the image. In FIG. 2c, the positive sample object is the bear paw, the negative sample object is the bear body, the image portion within the corresponding bounding box is framed by a solid line, and the label of the positive sample object is the bear paw.

Step II: inputting the image portion within the bounding box corresponding to the positive sample object, the image portion within the bounding box corresponding to the negative sample object, and the label into the matching model, to obtain a first matching degree between a feature of the positive sample object and a feature of the label, and a second matching degree between a feature of the negative sample object and the feature of the label.

The step of extracting an image feature in the matching model extracts the feature of the positive sample object from the image portion within the boundary box corresponding to the positive sample object, and extracts the feature of the negative sample object from the image portion within the bounding box corresponding to the negative sample object. The step of extracting a text feature extracts the feature of the label. Then, the step of converting an image feature dimension converts the dimension of the feature of the positive sample object and the dimension of the feature of the negative sample object into the preset dimension, and the step of converting a text feature dimension converts the dimension of the feature of the label into the preset dimension. After the dimension conversion, the step of matching calculates the first matching degree between the feature of the positive sample object and the feature of the label, and the second matching degree between the feature of the negative sample object and the feature of the label. The first matching degree is at least one of the distance or the cosine similarity between the feature of the positive sample object and the feature of the label, and the second matching degree is at least one of the distance or the cosine similarity between the feature of the negative sample object and the feature of the label.

Step III: training the matching model for a purpose of maximizing the first matching degree and minimizing the second matching degree, or for a purpose of a difference between the first matching degree and the second matching degree being greater than a preset threshold.

A target function is established based on the maximized first matching degree and the minimized second matching degree, or the target function is established based on the difference between the first matching degree and the second matching degree greater than the preset threshold, and then parameters of the matching model are iterated based on the target function. Alternatively, parameters of all or a part of steps of the matching model may be iterated. For example, parameters of the step of extracting an image feature, the step of extracting a text feature, the step of converting an image feature dimension, and the step of converting a text feature dimension use empirical values without iteration, and only parameters of the step of matching are iterated.

S240: obtaining the matching degree between the feature of the text and the feature of each object based on the respective matching degrees between the feature of each object and the features of words in the text.

Alternatively, a maximum matching degree or an average matching degree corresponding to the feature of each object with regard to the respective matching degrees between the feature of each object and the feature of words in the text is calculated, for use as the matching degree between the feature of the text and the feature of each object. For example, for the text "can you see the bear paw?", the matching degrees between the feature of "you" and the feature of the bear paw, between the feature of "can" and the feature of the bear paw, between the feature of "see" and the feature of the bear paw, between the feature of "bear paw" and the feature of the bear paw, and between the feature of "?" and the feature of the bear paw are 10%, 10%, 10%, 90%, and 10% respectively, and then the matching degree between the text and the feature of the bear paw is: the maximum matching degree 90%, or the average matching degree 26%. For another example, for the text "can you see the bear paw?", the matching degrees between the feature of "you" and the cluster glass, between the feature of "can" and the cluster glass, between the feature of "see" and the cluster glass, between the feature of "bear paw" and the cluster glass, and between the feature of "?" and the cluster glass are 15%, 10%, 10%, 10%, and 10% respectively, and then the matching degree between the text and the feature of the grass cluster is: the maximum matching degree 15%, or the average matching degree 11%.

S250: fusing the features of the plurality of objects as a fused feature of the image based on a matching degree between the feature of the text and a feature of each object of the plurality of objects.

S260: processing the text based on the fused feature of the image and the feature of the text.

Figure 2D:
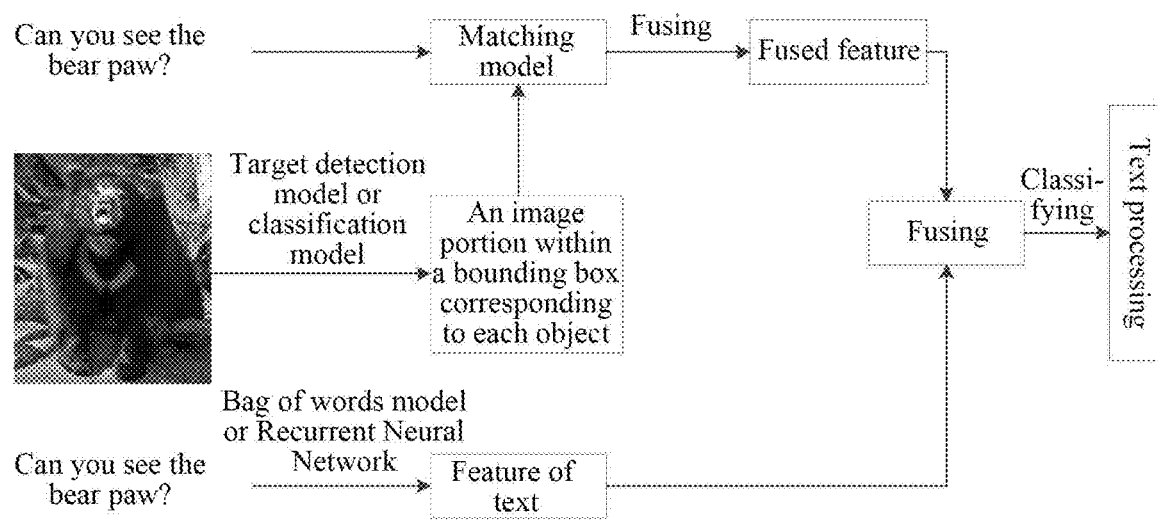
FIG. 2d is a flowchart of a method for image-based data processing using a matching model according to Embodiment II of the present disclosure.

FIG. 2d is a flowchart of a method for image-based data processing using a matching model according to Embodiment II of the present disclosure. An input of an apparatus for image-based data processing is the text "can you see the bear paw?", and the image is shown in FIG. 1b. The apparatus for image-based data processing not only extracts the feature of the text, but also obtains the matching degree by the matching model, then fuses the features of the plurality of objects as the fused feature of the image based on the matching degree, then performs fusion reclassification on the feature of the text and the fused feature, and then processes the text.

In the present embodiment, the image portion within the bounding box corresponding to each object and the text are inputted into the matching model successively, to obtain the respective matching degrees, outputted from the matching model, between the feature of each object and the features of words in the text, thus directly obtaining the matching degree between the feature of the object and the feature of each word respectively based on a pre-trained matching degree, reflecting words in the text corresponding to local features from the perspective of the image; and obtaining local information in the image corresponding to the words from the perspective of the text. The matching degree between the object and the text is specific to the matching degree between the object and each word, and fine-grain and accurate association between the local features of the image and the word is pre-learned.

Further, the matching degree between the feature of the text and the feature of each object is obtained based on the respective matching degrees between the feature of each object and the feature of words in the text, such that for the matching degree between the text and each word, the matching degree between the text and the object is comprehensively obtained, thus improving the accuracy of the matching degree, and further improving the text processing accuracy.

Further, the present embodiment trains the matching model using positive and negative samples, reduces the distance between matching positive sample object and the label, increases the distance between unmatching negative sample object and the label, and can effectively improve the model training accuracy. Moreover, the samples for pre-training the matching model include only the image portions within the bounding box and labels. Compared with VQA data including images, questions, and answers, the sample acquiring channels are extensive, then the application scenarios are wide, and the text is easily expanding. The method for image-based data processing using a matching model according to the present embodiment is a universal and easily expanding multimodal learning method with wide application scenarios, and low application costs. In the case where the computing system process of the original task is not changed greatly, the matching model may be applied to almost all multimodal tasks.

Further, the present embodiment makes full use of strong correlation between the label of the object and the object, and between the label and the text, and helps the apparatus for image-based data processing to strengthen learning the association between the object and the text.

Embodiment III

Figure 3:
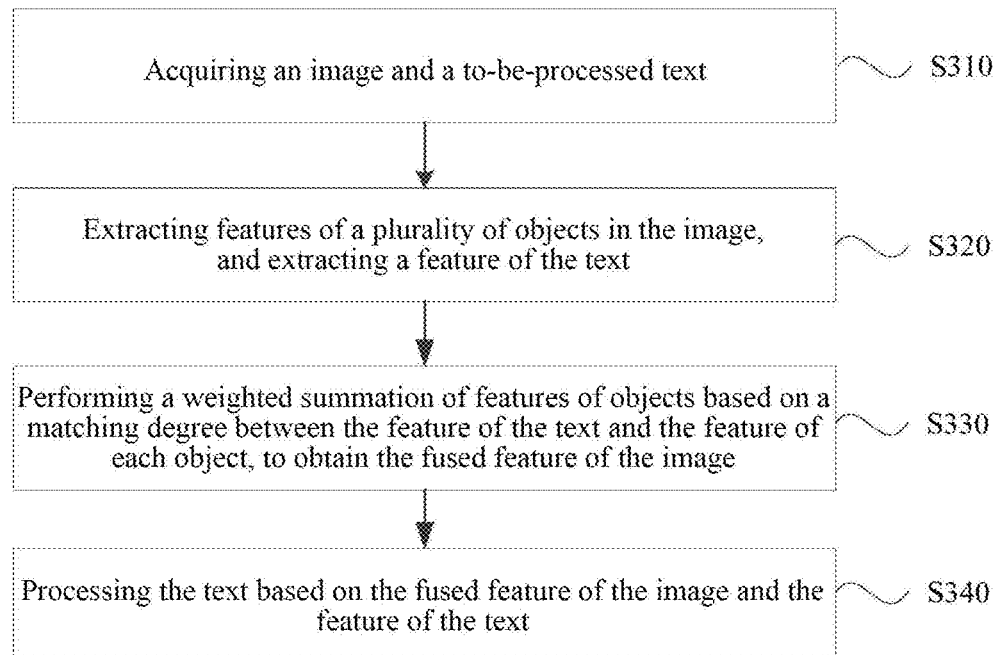
FIG. 3 is a flowchart of a method for image-based data processing according to Embodiment III of the present disclosure.

FIG. 3 is a flowchart of a method for image-based data processing according to Embodiment III of the present disclosure. The embodiment of the present disclosure specifies operations on the basis of the technical solutions of the above embodiments. Alternatively, the "fusing the features of the plurality of objects as a fused feature of the image based on a matching degree between the feature of the text and a feature of each object of the plurality of objects" is specific to "performing a weighted summation of the features of the objects based on the matching degree between the feature of the text and the feature of each object, to obtain the fused feature of the image." The method for image-based data processing as shown in FIG. 3 includes steps S310 to S340.

S310: acquiring an image and a to-be-processed text.

S320: extracting features of a plurality of objects in the image, and extracting a feature of the text.

S330: performing a weighted summation of features of objects based on a matching degree between the feature of the text and the feature of each object, to obtain the fused feature of the image.

Alternatively, the matching degree between the feature of the text and the feature of each object may be obtained using the following alternative embodiments.

The first alternative embodiment: the image portion within the bounding box corresponding to each object and the text are inputted into the matching model successively, to obtain the respective matching degrees, outputted from the matching model, between the feature of each object and the feature of words in the text; and the matching degree between the feature of the text and the feature of each object is obtained based on the respective matching degrees between the feature of each object and the feature of words in the text.

The second alternative embodiment: a category of each object is acquired; the category of each object is searched for in the text, and the matching degree between the feature of the text and the feature of each object is determined based on a searching result.

The above embodiments are referred to for details of specific description of the above two alternative embodiments. The description will not be repeated here.

In the present operation, the matching degree between the feature of the text and the feature of each object is used as a weight of each object, and a weighted summation of the features of the corresponding objects is performed using the weights, to obtain the fused features of the image. For example: the matching degree between the feature of the text "can you see the bear paw?" and the feature of the bear paw is 90%, the matching degree between the feature of the text "can you see the bear paw?" and the grass cluster is 10%, the matching degree between the feature of the text "can you see the bear paw?" and the feature of the tree trunk is 10%, and the matching degree between the feature of the text "can you see the bear paw?" and the feature of the bear leg is 50%, then the fused features of the image are 90%×the feature of the bear paw+10%×the feature of the grass cluster+10%×the feature of the tree trunk+50%×the feature of the bear leg.

It should be noted that, in order to ensure accurate and comprehensive features of the objects, when the features of the plurality of objects are fused, the features of the plurality of objects use the features without dimension conversion, i.e., the feature of each object extracted from the image portion within the bounding box corresponding to each object.

S340: processing the text based on the fused feature of the image and the feature of the text.

Compared with the existing technology, the present embodiment replaces high-level features of the image with the fused feature of the image. Obviously, the fused feature has prior knowledge of the matching degree between local features of the image and the text, and thus helps to improve the text processing accuracy. For example, since there is a high matching degree between the feature of the "bear paw" in the text and the feature of the bear paw object, the apparatus for image-based data processing can accurately find an area corresponding to the "bear paw" in the image, and then obtain the correct answer being "yes" after analysis.

Embodiment IV

Figure 4:
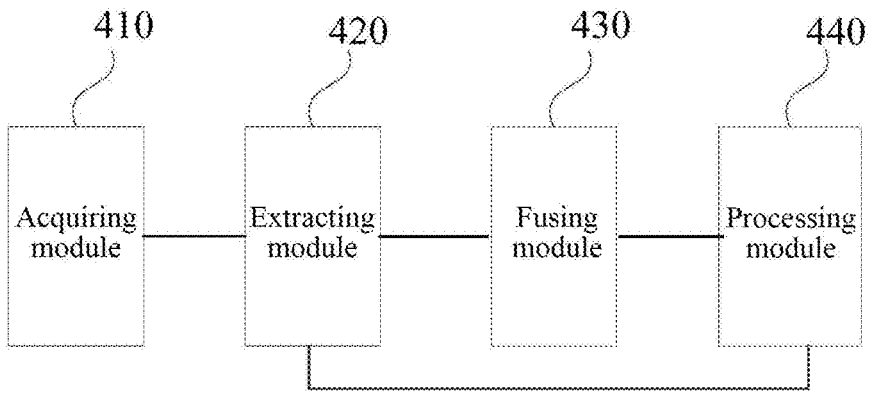
FIG. 4 is a schematic structural diagram of an apparatus for image-based data processing according to Embodiment IV of the present disclosure.

FIG. 4 is a schematic structural diagram of an apparatus for image-based data processing according to Embodiment IV of the present disclosure. The embodiment of the present disclosure is applicable to a case of identifying an image and processing a text. In conjunction with FIG. 4, the apparatus for image-based data processing includes: an acquiring module 410, an extracting module 420, a fusing module 430, and a processing module 440.

The acquiring module 410 is configured to acquire an image and a to-be-processed text.

The extracting module 420 is configured to extract features of a plurality of objects in the image, and extract a feature of the text.

The fusing module 430 is configured to fuse the features of the plurality of objects as a fused feature of the image based on a matching degree between the feature of the text and a feature of each object of the plurality of objects.

The processing module 440 is configured to process the text based on the fused feature of the image obtained by the fusing module 430 and the feature of the text extracted by the extracting module 420.

The embodiments of the present disclosure acquire an image and a to-be-processed text, extract features of a plurality of objects in the image, extract a feature of the text, fuse the features of the plurality of objects as a fused feature of the image based on a matching degree between the feature of the text and a feature of each object of the plurality of objects, make full use of the prior knowledge that the feature of the text is associated with the feature of the object, and adjust the feature of the image based on the matching degree, such that the fused feature pays more attention to a part strongly associated with the text, to avoid attention distribution and dispersion; and can improve the processing accuracy based on the fused feature strongly associated with the text and the feature of the text.

Alternatively, the apparatus further includes a first matching degree acquiring module configured to, before the fusing the features of the plurality of objects as a fused feature of the image based on a matching degree between the feature of the text and a feature of each object of the plurality of objects, input an image portion within a bounding box corresponding to each object and a text into a matching model successively, to obtain respective matching degrees, outputted from the matching model, between a feature of each object and features of words in the text; and obtain the matching degree between the feature of the text and the feature of each object based on the respective matching degrees between the feature of each object and the features of words in the text.

Alternatively, the matching model includes: a step of extracting an image feature, a step of extracting a text feature, a step of converting an image feature dimension, a step of converting a text feature dimension, and a step of matching. The step of extracting an image feature is used for extracting the feature of each object from the image portion within the bounding box corresponding to each object; the step of converting an image feature dimension is used for converting a dimension of the feature of each object into a preset dimension; the step of extracting a text feature is used for extracting the feature of each word in the text; the step of converting a text feature dimension is used for converting a dimension of the feature of each word in the text into the preset dimension; and the step of matching is used for calculating the matching degree between the feature of each object with the preset dimension and the feature of each word with the preset dimension.

Alternatively, the step of matching is specifically used for: calculating respective distances and/or cosine similarities between the feature of each object with the preset dimension and the features of words in the text with the preset dimension, to obtain the matching degrees between the feature of each object and the feature of words in the text.

Alternatively, the apparatus further includes a model training module configured to acquire, before inputting an image portion within a bounding box corresponding to each object and a text into a matching model successively, an image portion within a bounding box corresponding to a positive sample object for training the matching model, an image portion within a bounding box corresponding to a negative sample object for training the matching model, and a label of the positive sample object; input the image portion within the bounding box corresponding to the positive sample object, the image portion within the bounding box corresponding to the negative sample object, and the label into the matching model, to obtain a first matching degree between a feature of the positive sample object and a feature of the label, and a second matching degree between a feature of the negative sample object and the feature of the label; train the matching model for a purpose of maximizing the first matching degree and minimizing the second matching degree, or for a purpose of a difference between the first matching degree and the second matching degree being greater than a preset threshold.

Alternatively, the first matching degree acquiring module is specifically configured to, when obtaining the matching degree between the feature of the text and the feature of each object based on the respective matching degrees between the feature of each object and the feature of words in the text: calculate a maximum matching degree or an average matching degree corresponding to the feature of each object with regard to the respective matching degrees between the feature of each object and the feature of words in the text, for use as the matching degree between the feature of the text and the feature of each object.

Alternatively, the apparatus further includes a second matching degree acquiring module configured to, before the fusing the features of the plurality of objects as a fused feature of the image based on a matching degree between the feature of the text and a feature of each object of the plurality of objects, acquire a category of each object; search for the category of each object in the text, and determine the matching degree between the feature of the text and the feature of each object based on a search result.

Alternatively, the fusing module 430 is specifically configured to, when fusing the features of the plurality of objects as a fused feature of the image based on a matching degree between the feature of the text and a feature of each object of the plurality of objects: perform a weighted summation of the features of objects based on the matching degree between the feature of the text and the feature of each object, to obtain the fused feature of the image.

The apparatus for image-based data processing according to the embodiment of the present disclosure may execute the method for image-based data processing according to any embodiment of the present disclosure, and has corresponding function modules for executing the method and beneficial effects.

Embodiment V

Figure 5:
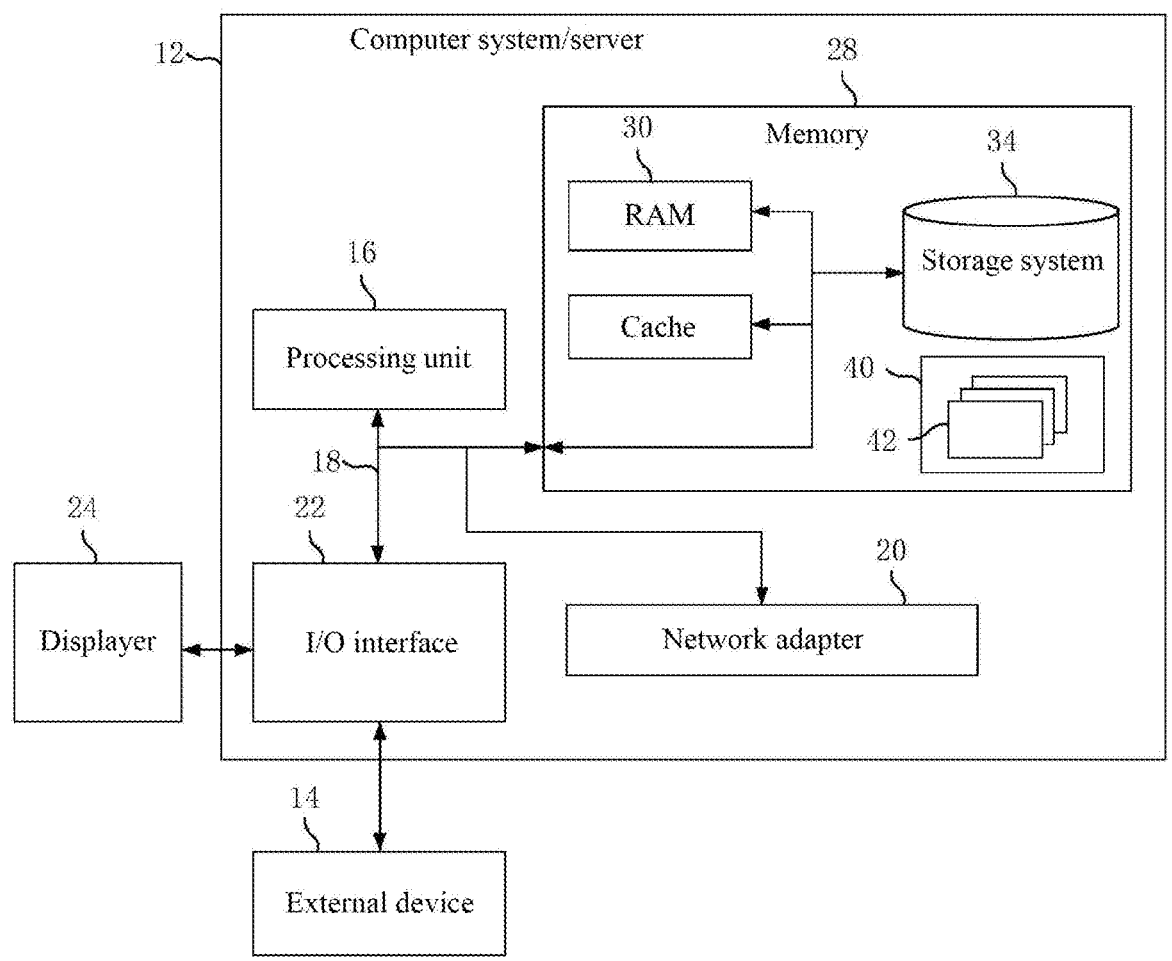
FIG. 5 is a schematic structural diagram of an electronic device according to Embodiment V of the present disclosure.

FIG. 5 is a schematic structural diagram of an electronic device according to Embodiment V of the present disclosure. FIG. 5 shows a block diagram of an example electronic device 12 adapted to implement the embodiments of the present disclosure. The electronic device 12 shown in FIG. 5 is merely an example, and should not limit the functions and scope of use of the embodiments of the present disclosure.

As shown in FIG. 5, the electronic device 12 is expressed in the form of a general-purpose computing device. Components of the electronic device 12 may include, but are not limited to: one or more processors or a processing unit 16, a system memory 28, and a bus 18 connecting different system components (including the system memory 28 and the processing unit 16).

The bus 18 represents one or more of a few bus structures, including a memory bus or a memory controller, a peripheral bus, a graphics acceleration port, a processor, or a local bus with any bus structure of a plurality of bus structures. For example, the system structures include, but are not limited to, an industrial standard architecture (ISA) bus, a micro channel architecture (MAC) bus, an enhanced ISA bus, a Video Electronics Standards Association (VESA) local bus, and a peripheral component interconnect (PCI) bus.

The electronic device 12 typically includes a plurality of computer system readable media. These media may be any available medium that can be accessed by the electronic device, including volatile media, non-volatile media, removable media and non-removable media.

The system memory 28 may include a computer system readable medium in the form of a volatile memory, such as a random access memory (RAM) 30 and/or a cache memory 32. The electronic device 12 may further include other removable/non-removable, and volatile/non-volatile computer system storage media. By way of example only, a storage system 34 may be used for reading from and writing in non-removable and nonvolatile magnetic media (not shown in FIG. 5, generally known as a "hard drive"). A disk drive for reading from and writing in a removable non-volatile disk (such as a "floppy disk") and an optical driver for reading from and writing in a removable non-volatile disk (such as CD-ROM, DVD-ROM, or other optical media) may be provided, though the disk drive or the optical driver is not shown in FIG. 5. Under the circumstances, each drive may be connected to the bus 18 through one or more data media interfaces. The memory 28 may include at least one program product, the program product has a set of (e.g., at least one) program modules, and the program modules are configured to execute the functions of the embodiments of the present disclosure.

A program/utility software 40 with a set of (at least one) program modules 42 may be stored in, e.g., the memory 28. Such a program module 42 includes, but is not limited to, an operating system, one or more application programs, other program modules, and program data. Each of these examples or a combination thereof may include implementation of a network environment. The program module 42 generally executes the functions and/or methods in the embodiments according to the present disclosure.

The electronic device 12 may also communicate with one or more external devices 14 (e.g., a keyboard, a pointing device, a displayer 24, and a camera), and may also communicate with one or more devices that cause a user to interact with the electronic device 12, and/or communicates with any device (e.g., a network card and a modem) that causes the electronic device 12 to communicate with one or more of other computing devices. This communication may be performed via an input/output (I/O) interface 22. Moreover, the electronic device 12 may further communicate with one or more networks (e.g., a local area network (LAN), a wide area network (WAN), and/or a public network such as the Internet) via a network adapter 20. As shown in the figure, the network adapter 20 communicates with other modules of the electronic device 12 through the bus 18. It should be appreciated that other hardware and/or software modules may be used in combination with the electronic device 12, including but not limited to: a microcode, a device driver, a redundancy processing unit, an external disk drive array, a RAID system, a tape drive, and a data backup storage system, though the modules are not shown in the figure.

The processing unit 16 executes various functional applications and data processing by running a program stored in the system memory 28, such as implementing the method for image-based data processing according to the embodiments of the present disclosure.

Embodiment VI

Embodiment VI of the present disclosure further provides a computer readable storage medium, storing a computer program thereon, where the program, when executed by a processor, implements the method for image-based data processing according to any one embodiment of the present disclosure.

Any combination of one or more computer readable media may be used as the computer storage medium of the embodiments of the present disclosure. The computer readable medium may be a computer readable signal medium or a computer readable storage medium. An example of the computer readable storage medium may include, but is not limited to: electric, magnetic, optical, electromagnetic, infrared, or semiconductor systems, apparatuses, elements, or a combination of any of the above. A more specific example (non-enumerated list) of the computer readable storage medium may include, but is not limited to: electrical connection with one or more wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. Herein, the computer readable storage medium may be any tangible medium containing or storing programs which may be used by, or used in combination with, a command execution system, apparatus, or element.

The computer readable signal medium may include data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element.

The program codes contained on the computer readable medium may be transmitted with any suitable medium, including but not limited to: wireless, wired, optical cable, RF medium, etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

It should be noted that, the above description only provides preferred embodiments of the present disclosure and the employed technical principles. It should be appreciated by those skilled in the art that the present disclosure is not limited to the specific embodiments described herein. Those skilled in the art can make various obvious changes, readjustments, and replacements without departing from the scope of protection of the present disclosure. Therefore, while the present disclosure is illustrated in detail in combination with the above embodiments, the present disclosure is not only limited to the above embodiments, and can further include more other equivalent embodiments without departing from the concept of the present disclosure. The scope of the present disclosure is defined by the scope of the appended claims.

What is claimed is:

1. A method for image-based data processing, the method comprising:
   acquiring an image and a to-be-processed text;
   extracting features of a plurality of objects in the image, and extracting a feature of the text;
   fusing the features of the plurality of objects as a fused feature of the image based on a matching degree between the feature of the text and a feature of each object of the plurality of objects; and
   processing the text based on the fused feature of the image and the feature of the text.

2. The method according to claim 1, wherein before the fusing the features of the plurality of objects as a fused feature of the image based on a matching degree between the feature of the text and a feature of each object of the plurality of objects, the method further comprises:
   acquiring a category of the each object;
   searching for the category of the each object in the text, and determining the matching degree between the feature of the text and the feature of the each object based on a searching result.

3. The method according to claim 1, wherein the fusing the features of the plurality of objects as a fused feature of the image based on a matching degree between the feature of the text and a feature of each object of the plurality of objects further comprises:
   performing a weighted summation of the features of the objects based on the matching degree between the feature of the text and the feature of the each object, to obtain the fused feature of the image.

4. The method according to claim 1, wherein before the fusing the features of the plurality of objects as a fused feature of the image based on a matching degree between the feature of the text and a feature of each object of the plurality of objects, the method further comprises:
   inputting an image portion within a bounding box corresponding to each object and the text into a matching model successively, to obtain respective matching degrees between a feature of each object and features of words in the text, the respective matching degrees being outputted from the matching model; and
   obtaining the matching degree between the feature of the text and the feature of the each object based on the respective matching degrees between the feature of the each object and the features of the words in the text.

5. The method according to claim 4, wherein before the inputting an image portion within a bounding box corresponding to each object and the text into a matching model successively, the method further comprises:
   acquiring an image portion within a bounding box corresponding to a positive sample object for training the matching model, an image portion within a bounding box corresponding to a negative sample object for training the matching model, and a label of the positive sample object;
   inputting the image portion within the bounding box corresponding to the positive sample object, the image portion within the bounding box corresponding to the negative sample object, and the label into the matching model, to obtain a first matching degree between a feature of the positive sample object and a feature of the label, and a second matching degree between a feature of the negative sample object and the feature of the label; and
   training the matching model for a purpose of maximizing the first matching degree or minimizing the second matching degree, or for a purpose of a difference between the first matching degree and the second matching degree being greater than a preset threshold.

6. The method according to claim 4, wherein the obtaining the matching degree between the feature of the text and the feature of the each object based on respective matching degrees between the feature of the each object and the features of the words in the text comprises:
   calculating a maximum matching degree or an average matching degree corresponding to the feature of the each object with regard to the respective matching degrees between the feature of the each object and the features of the words in the text, for use as the matching degree between the feature of the text and the feature of the each object.

7. The method according to claim 4, wherein the matching model comprises: a step of extracting an image feature, a step of extracting a text feature, a step of converting an image feature dimension, a step of converting a text feature dimension, and a step of matching;
   wherein the step of extracting an image feature is used for extracting the feature of the each object from the image portion within the bounding box corresponding to the each object; the step of converting an image feature dimension is used for converting a dimension of the feature of the each object into a preset dimension; the step of extracting a text feature is used for extracting the feature of the each word in the text; the step of converting a text feature dimension is used for converting a dimension of the feature of the each word in the text into the preset dimension; the step of matching is used for calculating the respective matching degrees between the feature of the each object with the preset dimension and the feature of the words with the preset dimension.

8. The method according to claim 7, wherein the step of matching is specifically used for:
   calculating distances and/or cosine similarities between the feature of the each object with the preset dimension and the features of the words in the text with the preset dimension, to obtain the matching degree between the feature of the each object and the feature of the each word in the text.

9. An apparatus for image-based data processing, the apparatus comprising:
   at least one processor; and a memory storing instructions, wherein the instructions when executed by the at least one processor, cause the at least one processor to perform operations, the operations comprising:

acquiring an image and a to-be-processed text;

extracting features of a plurality of objects in the image, and extracting a feature of the text;

fusing the features of the plurality of objects as a fused feature of the image based on a matching degree between the feature of the text and a feature of each object of the plurality of objects; and processing the text based on the fused feature of the image and the feature of the text.

10. A non-transitory computer readable storage medium, storing a computer program thereon, wherein the program, when executed by a processor, causes the processor to perform operations, the operations comprising:

acquiring an image and a to-be-processed text;

extracting features of a plurality of objects in the image, and extracting a feature of the text;

fusing the features of the plurality of objects as a fused feature of the image based on a matching degree between the feature of the text and a feature of each object of the plurality of objects; and processing the text based on the fused feature of the image and the feature of the text.

* * * * *